(12) United States Patent
Kobayashi

(10) Patent No.: US 7,372,236 B2
(45) Date of Patent: May 13, 2008

(54) CHARGER AND DC-DC CONVERTER

(75) Inventor: Kimiyoshi Kobayashi, Hanno (JP)

(73) Assignee: Shindengen Electric Manufacturing Co., Ltd, Tokyo (JP)

(*) Notice: Subject to any disclaimer, the term of this patent is extended or adjusted under 35 U.S.C. 154(b) by 70 days.

(21) Appl. No.: 10/579,719

(22) PCT Filed: Nov. 10, 2004

(86) PCT No.: PCT/JP2004/016626

§ 371 (c)(1),
(2), (4) Date: May 17, 2006

(87) PCT Pub. No.: WO2005/050813

PCT Pub. Date: Jun. 2, 2005

(65) Prior Publication Data

US 2007/0108943 A1 May 17, 2007

(30) Foreign Application Priority Data

Nov. 19, 2003 (JP) .............. 2003-388747
Nov. 19, 2003 (JP) .............. 2003-388748

(51) Int. Cl.
*H01M 10/46* (2006.01)
(52) U.S. Cl. .................................. 320/137
(58) Field of Classification Search .......... 320/101, 320/137, 140, 162, 163
See application file for complete search history.

(56) References Cited

U.S. PATENT DOCUMENTS 3,927,361 A * 12/1975 Macharg .............. 320/149
5,736,831 A * 4/1998 Harrington ............ 320/104
2003/0155887 A1* 8/2003 Bourilkov et al. ....... 320/104

FOREIGN PATENT DOCUMENTS

JP 62-154121 A 7/1987
JP 03-235234 A 10/1991
JP 11-341699 A 12/1999

OTHER PUBLICATIONS

PCT International Search Report mailed on Feb. 22, 2005.

* cited by examiner

*Primary Examiner*—Edward H Tso
(74) *Attorney, Agent, or Firm*—Rader, Fishman & Grauer PLLC; Toshikatsu Imaizumi (57) ABSTRACT

A novel charger wherein a constant electric power control is made such that an electric power feed at the output end is the same as the electric power fed by a fuel cell at the input end, thereby keeping a cell charge current constant, reducing the number of components and further realizing a stable charging. A charger, an input source (Vfc) of which is a fuel cell or solar cell exhibiting a relatively large output impedance during electric power feed, includes a secondary cell (B) at the output end. A current control circuit (10), which is connected to the secondary cell, supplies a charging current to be caused to flow into the secondary cell. The value of the charging current is obtained from a control amount necessary for maintaining a converter output voltage at a drooping voltage as set.

15 Claims, 5 Drawing Sheets

CHARGER AND DC-DC CONVERTER

TECHNICAL FIELD

The present invention relates to a charger that obtains electric power necessary for a fuel cell and to a DC-DC converter.

BACKGROUND ART

Figure 12:
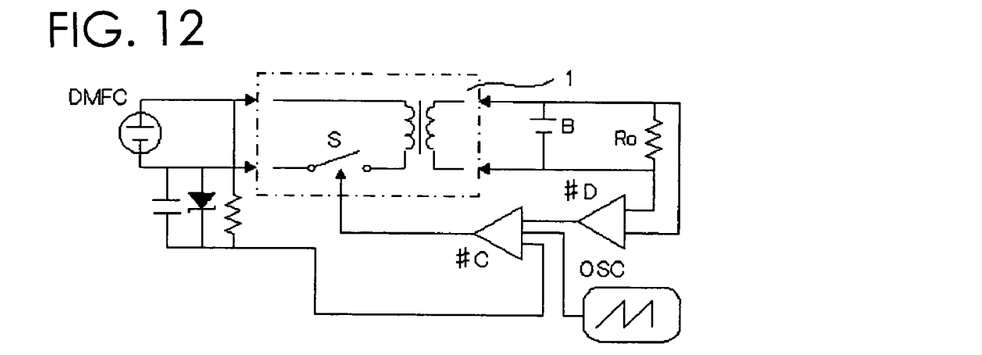
FIG. 12 is a circuit diagram illustrating a conventional DC-DC converter having a charging function.
Figure 13:
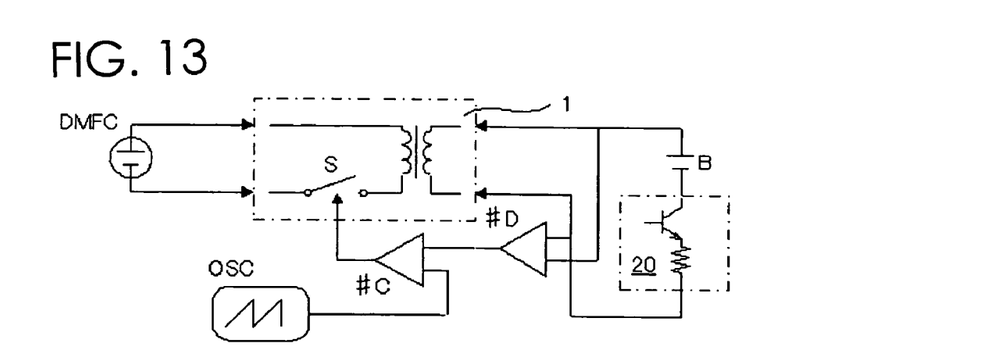
FIG. 13 is a circuit diagram illustrating a DC-DC converter different from that shown in FIG. 12.

FIGS. 12 and 13 show a DC-DC converter having a charging function in which a cell, such as a conventional fuel cell or solar cell is used as an input source, and a load Ro and a secondary cell B are connected in parallel to an output end of the DC-DC converter. The DC-DC converter having a charger shown in FIG. 12 has means for controlling an input voltage, which is lowered due to output impedance when electric power is supplied, so as to become constant, thereby realizing constant input of electric power in which when an input supply power Pin is smaller than an output supply power Pout, the input voltage becomes constant, and an output voltage becomes a dropping state, and means for controlling the output voltage so as to become constant, in which when the input supply power Pin is larger than the output supply power Pout, the input voltage increases, (for example, see to Patent Document 1 for the solar cell).

Furthermore, FIG. 13 shows a charger shown includes a charging circuit 20 is connected to the secondary cell B, and the charger has a unit that controls an input voltage, which is lowered due to output impedance when electric power is supplied, so as to be constant, thus realizing constant input of electric power. In addition, in the charger circuit the input power Pin is set to be larger than the output power Pout, and a constant voltage control circuit and a constant current control circuit are provided in order to stably perform the charging of a current into the secondary cell B.

Patent Document 1: Japanese Unexamined Patent Application Publication No. 11-341699

DISCLOSURE OF INVENTION

Problems to be Solved by the Invention

In the case of the former, however, when the input supply power Pin is higher than the output supply power Pout, the input voltage rises. For this reason, specifically when a fuel cell is used as the input source, the fuel cell is deteriorated due to rapid change in voltage environments since it generates electric power by a chemical reaction.

On the other hand, in the case of the latter, in a charger using a cell such as a fuel cell or a solar cell having relatively large output impedance when electric power is supplied as an input source Vfc, it is possible to realize constant input of electric power by controlling an input voltage, which becomes low due to output impedance when electric power is supplied, to be constant (when the input supply power Pin is smaller than the output supply power Pout). In this case, if an output voltage is set to a dropping point (which is slightly lower than an output constant voltage) voltage, it is possible to make the charging current become constant without using the constant current control circuit. However, the conventional charger does not have the above-mentioned structure, so that there are problems, for example, generation of heat and a complicated circuit structure.

Furthermore, for example, a fuel cell generates electric power by way of a chemical reaction, so that since a change in a supply voltage will lead to degradation, it is thus preferred that a voltage during charging be constant. In addition, when charging reaches an end thereof, the input supply power Pin becomes higher than the output supply power Pout, and the output voltage becomes constant by performing constant voltage control, so that the input voltage increases. At this time, it is preferable to detect the increase in the input voltage and to stop the charging operation.

In view of the above problems, the present invention provides a charger and a DC-DC converter having the charger capable of preventing an increase in the output voltage of a cell and thus of preventing deterioration of the cell by making electric power on the output side thereof equal to electric power on the input side of a fuel cell.

Means for Solving the Problems

In order to solve the problems, a charger according to the present invention that charges a secondary cell through a converter for controlling input electric power from a cell having relatively large output impedance when electric power is supplied, such as a fuel cell or a solar cell as an input source, comprises a current control circuit having the secondary cell provided at an output end thereof, that is connected to the secondary cell, and supplies a charging current flowing into the secondary cell as a current value which is obtained from a control amount necessary for keeping an output voltage of the converter at a dropping voltage to be set.

Further, in the current control circuit, when charging to the second cell is started, the current control circuit performs constant current charging by using the charging current flowing into the secondary cell as a current value determined according to an input electric power value, and at an end period of the charging when the voltage of the secondary cell reaches approximately an output voltage, the current control circuit stops performing constant control of the input electric power and detects a rise in an input voltage, thereby stopping the charging.

The current control circuit includes a comparing unit which compares the output voltage of the converter with a reference voltage and outputs the control amount and a constant current control unit that performs constant current control on the secondary cell on the basis of the control value.

Moreover, in the charger, the constant current control unit performs the constant current control using a semiconductor switch.

The constant current control unit includes a first level conversion unit which is connected to an output end of the comparing unit, the first level conversion unit being connected to a positive output end of the converter and a control terminal of the semiconductor switch, and a second level conversion unit which is connected to an output terminal of the semiconductor switch, the second level conversion unit being connected to a negative output end of the converter and a control terminal of a second semiconductor switch wherein an output terminal of the second semiconductor switch is connected to an input terminal of the secondary cell, and when charging to the secondary cell is started, the current control circuit performs the constant current charging by using the charging current flowing into the secondary cell as a current value that is determined according to an input electric power value, and at an end period of charging when the voltage of the secondary cell reaches approximately an output voltage, the current control circuit stops performing the constant control of the input electric power and detects a rise in the input voltage, thereby stopping the charging.

The charger has functions of detecting a voltage of the input source, of comparing the input voltage with a voltage control input that is arbitrarily set, and of controlling the input voltage to be constant on the basis of the control value.

A DC-DC converter according to the present invention, that uses, as an input source, a cell such as a fuel cell or a solar cell, having relatively large output impedance when electric power is supplied, comprises the above-mentioned charger, wherein a secondary cell and a load are connected in parallel to an output end of the DC-DC converter, in which when a current flowing through the load decreases, a current control circuit connected to the secondary cell increases a charging current flowing into the secondary cell, and when the current flowing through the load increases, the current control circuit decreases the charging current flowing into the secondary cell, thereby keeping an output voltage at a dropping voltage to be set.

In the DC-DC converter, the current control circuit includes a comparing unit which compares the output voltage of the DC-DC converter with a reference voltage and outputs the control value, and a constant current control unit that performs constant current control on the secondary cell on the basis of the control value.

Furthermore, in the DC-DC converter, it is preferable that the constant current control unit performs the constant current control using a semiconductor switch.

In the DC-DC converter, the constant current control unit includes, a first level conversion unit which is connected to an output end of the comparing unit, the first level conversion unit being connected to a positive output end of the DC-DC converter and a control terminal of the semiconductor switch, and a second level conversion unit which is connected to an output terminal of the semiconductor switch, the second level conversion unit being connected to a negative output end of the DC-DC converter and a control terminal of a second semiconductor switch, wherein an output terminal of the second semiconductor switch is connected to an input terminal of the secondary cell, in which when a current flowing through the load decreases, the current control circuit increases a charging current flowing into the secondary cell, and when the current flowing through the load increases, the current control circuit decreases the charging current flowing into the secondary cell, thereby keeping the output voltage at a dropping voltage to be set.

The DC-DC converter has functions of detecting a voltage of the input source, of comparing the input voltage with a voltage control input that is arbitrarily set, and of controlling the input voltage to be constant on the basis of the control value.

ADVANTAGES

As described above, in the charger according to the invention, the current control circuit is connected to the secondary cell. When charging to the secondary cell is started, the current control circuit increases a charging current flowing into the secondary cell. When the voltage of the secondary cell reaches approximately an output voltage, the current control circuit decreases the charging current flowing into the secondary cell. Therefore, according to this structure, it is possible to make the output supply power constant as a whole and thus to control an input voltage (for example, the output of the fuel cell) to be constant. Furthermore, the DC-DC converter according to the present invention can have the same advantages as those of the charger.

Further, the output voltage can be stabilized at a predetermined dropping point. Therefore, the invention is advantageous since stable electric power can be supplied to a load.

REFERENCE NUMERALS

Vfc: INPUT SOURCE (FUEL CELL)
Vset: VOLTAGE CONTROL INPUT
Ro: LOAD
B: SECONDARY CELL
1: CONVERTER
2: OPERATIONAL STATE DETECTING CIRCUIT
10, 10a, 10b, 10c, 10d: CURRENT CONTROL CIRCUIT
11: COMPARING CIRCUIT
12a, 12b, 12c, 12d: CONSTANT CURRENT CONTROL CIRCUIT
20: CHARGING CIRCUIT
A, #F: DIFFERENTIAL AMPLIFIER
B, #D, #G, #H: COMPARATOR
C: VOLTAGE DETECTOR
E: AMPLIFIER
Q1: CONTROL SWITCH OF CONVERTER 1
Q2, Q3a, Q3b, Q10: SEMICONDUCTOR SWITCH
R1, R2: RESISTOR
R3, R4, R5, R6, R7, R8, R22, R23: VOLTAGE-DIVIDING RESISTOR
Rm, R24: CURRENT DETECTION RESISTOR
Ref1, Ref2: REFERENCE VOLTAGE
D1: DIODE

BEST MODE FOR CARRYING OUT THE INVENTION

Figure 1:
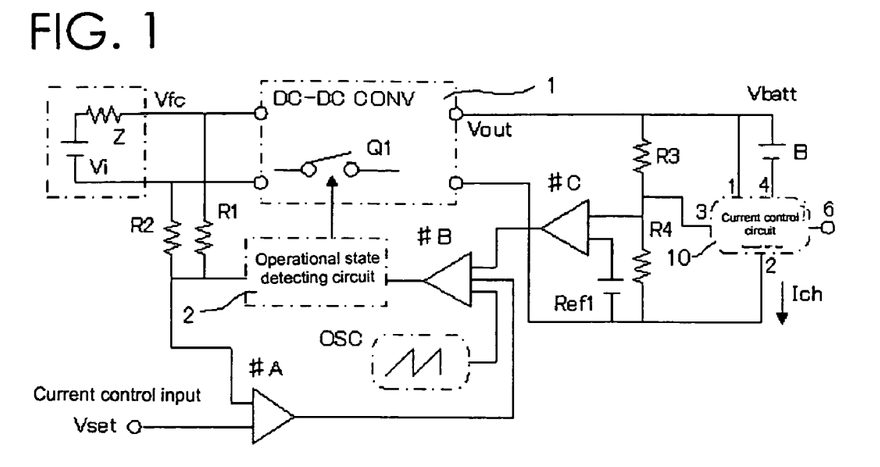
FIG. 1 is a circuit diagram illustrating a charger according to a preferred embodiment of the present invention.

FIG. 1 is a circuit diagram illustrating a charger according to a preferred embodiment of the present invention. The charger shown in FIG. 1 uses a fuel cell having a relatively large output impedance Z, as an input source Vfc, when electric power is supplied. Although the fuel cell is used as the input source Vfc, any cell having relatively large output impedance, such as a solar cell, can be used as the input source Vfc in the present embodiment. The charger includes a converter 1. A secondary cell B is connected to an output end of the converter 1.

Also, voltage-dividing resistors R3 and R4 are connected to the output end of the converter 1. A current control circuit 10 is connected to a connection point between the voltage-dividing resistors R3 and R4. The current control circuit 10 is also connected to a negative terminal of the secondary cell B. When charging to the secondary cell B is started, the current control circuit 10 carries out the charging on the basis of a current value of the constant current, which is decided according to an input electric power value so that a charging current flowing into the secondary cell B is constant. When the voltage of the secondary cell B reaches approximately an output voltage so that the charging reaches the end thereof the current control circuit 10 stops the control for the constant input electric power, and stops the charging by detecting a rising input voltage. In this case, a detailed example of the current control circuit 10 will be described later.

The charger according to the present invention further includes a voltage comparator #C. The voltage comparator #C compares an output voltage signal detected by the voltage-dividing resistors R3 and R4 with a reference voltage Ref1, thereby performing level conversion thereon, and outputs a signal to a comparator #B connected to an output end of the voltage comparator #C.

The charger according to the present invention further includes a differential amplifier #A. The differential amplifier #A receives a voltage control input Vset having an arbitrary value, for controlling a voltage input from the outside to the charger, and an output voltage of a fuel cell, that is, an input voltage Vfc of the charger, and outputs a control signal for controlling the input voltage Vfc to generate the same value as that of the voltage control input Vset.

In this case, the voltage control input Vset can be represented by the following expression:

$$Vset = Vfc * R2/(R1+R2).$$

For example, if R1=R2=1 kΩ and a cell output needs to be 5V, Vset=5V*1 k/(1 k+1 k)=2.5 V. Therefore, 2.5V can be input from the outside.

The comparator #B compares a voltage signal, which is obtained by converting the level of an output voltage Vbatt of the secondary cell by the voltage detector #C, with a control signal for stable control, which is output from a triangular wave oscillator (OSC), and outputs a driving signal to a control switch Q1 of the converter 1 through an operational state detecting circuit 2, which will be described below.

The charger according to the present invention includes the operational state detecting circuit 2. The operational state detecting circuit 2 is a circuit that compares a compensation voltage with an output voltage of the fuel cell every predetermined-time, and detects whether the fuel cell is available, in which when the output voltage of the fuel cell is lower than the compensation voltage, the operational state detecting circuit 2 stops the operation of the control switch Q1 of a switching power source, and when the output voltage of the fuel cell is higher than the compensation voltage, the operational state detecting circuit 2 normally operates the control switch Q1 of the switching power source. In this case, since the operational state detecting circuit 2 is provided for emergency measures, it may be omitted.

Figure 2:
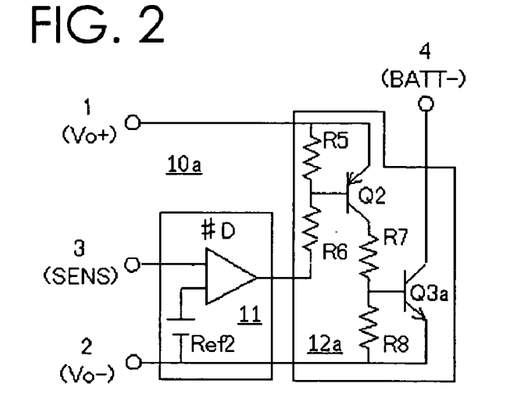
FIG. 2 is a circuit diagram illustrating an example of a main portion of the charger according to the embodiment of the present invention.

Another example of the current control circuit 10 will be described below with reference to FIG. 2. A current control circuit 10a according to the present embodiment includes a comparing circuit 11 that compares an output voltage Vout of the DC-DC converter with a reference voltage Ref2 thereby outputting a control value, and a constant current control circuit 12a that performs constant current control on the secondary cell B by using the control value. The comparing circuit 11 includes a comparator #D that compares the output voltage with the reference voltage Ref2, converts the level of the voltage, and outputs a control value.

The constant current control circuit 12a includes voltage-dividing resistors R5 and R6. The voltage-dividing resistor R5 has one end connected to a positive output end of the converter 1. The voltage-dividing resistor R6 has one end connected to an output end of the comparator #D. Furthermore, a control terminal of a semiconductor switch Q2 is connected to a connecting point between the voltage-dividing resistors R5 and R6. The constant current control circuit 12a further includes voltage-dividing resistors R7 and R8. The voltage-dividing resistor R7 has one end connected to an output terminal of the semiconductor switch Q2. The voltage-dividing resistor R8 has one end connected to a negative output end of the converter 1.

Furthermore, a control terminal of a second semiconductor switch Q3a is connected to a connection point between the voltage-dividing resistors R7 and R8. The second semiconductor switch Q3a is connected to a negative terminal of the secondary cell B. Accordingly, when an output voltage rises, the current control circuit 10a is controlled to turn on the semiconductor switch Q2 and the second semiconductor switch Q3a, so that electric power is supplied to the secondary cell B as a constant current and the output voltage of the converter 1 falls to a voltage determined according to the reference voltage Ref2.

Meanwhile, when the output voltage falls, the current control circuit 10a is controlled to turn off the semiconductor switch Q2 and the second semiconductor switch Q3a, so that the electric power supply to the secondary cell B is suppressed and the output voltage of the converter 1 rises to a voltage determined according to the reference voltage Ref2.

Figure 3:
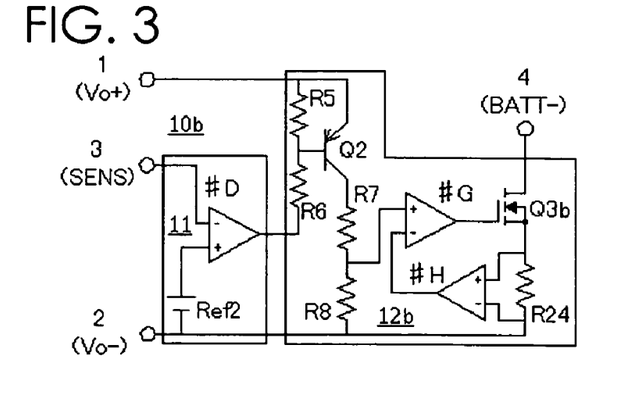
FIG. 3 is a circuit diagram illustrating another example different from that shown in FIG. 2.

FIG. 3 shows a detailed example of another current control circuit 10b. The current control circuit 10b includes a comparing circuit 11 that compares the output voltage of the charger according to the present embodiment with a reference voltage Ref2, and outputs a control value, and a constant current control circuit 12b that performs constant current control on the secondary cell B on the basis of the control value. The comparing circuit 11 includes a comparator #D that compares the output voltage of the charger with the reference voltage Ref2, converts the level of the voltage, and outputs a control value.

The constant current control circuit 12b includes voltage-dividing resistors R5 and R6. The voltage-dividing resistor R5 has one end connected to a positive output end of the converter 1. The voltage-dividing resistor R6 has one end connected to an output terminal of the comparator #D. A control terminal of a semiconductor switch Q2 is connected to a connection point between the voltage-dividing resistors R5 and R6. The constant current control circuit 12*b* further includes voltage-dividing resistors R7 and R8. The voltage-dividing resistor R7 has one end connected to an output terminal of the semiconductor switch Q2. The voltage-dividing resistor R8 has one end connected to a negative output end of the converter 1.

A detection terminal of a comparator #G is connected to a connection point between the voltage-dividing resistors R7 and R8. An output terminal of the comparator #G is connected to a gate terminal of a second semiconductor switch Q3*b* which is, for example, a field effect transistor (FET). The second semiconductor switch Q3*b* is connected to a negative terminal of a secondary cell B. Furthermore, one end of a current detection resistor R24 is connected to a source terminal of the second semiconductor switch Q3*b*. Both ends of the current detection resistor R24 are connected to two input terminals of a comparator #H. An output terminal of the comparator #H is connected to a reference terminal of the comparator #G so as to carry out feedback. Therefore, the electric power is supplied to the secondary cell B as a constant current by turning on the semiconductor switch Q2 and the secondary semiconductor switch Q3*b*, so that the output voltage of the charger is controlled so as to fall to the voltage determined according to the reference voltage Ref2. At this time, since the highest value of the constant current can be limited by the voltage-dividing resistors R7 and R8, a charging current of the secondary cell B can be arbitrarily set, so that it possible to realize a stable system.

Meanwhile, when the output voltage falls, the electric power to the secondary cell B is suppressed by turning off the semiconductor switch Q2 and the second semiconductor switch Q3*b*, so that the output voltage of the charger is controlled so as to rise to the voltage determined according to the reference voltage Ref2.

Figure 4:
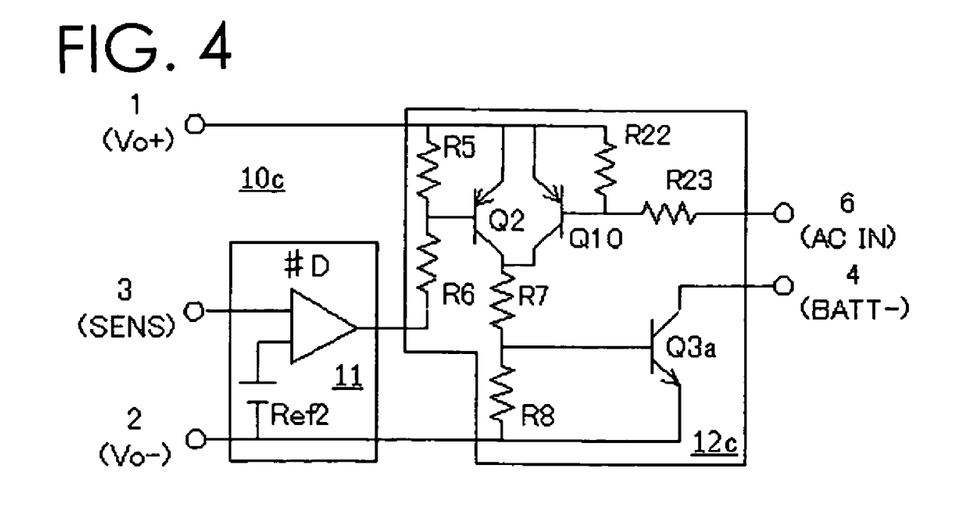
FIG. 4 is a circuit diagram illustrating yet another example different from those shown in FIGS. 2 and 3.

Furthermore, a detailed example of still another current control circuit 10*c* will be described with reference to FIG. 4. The current control circuit 10*c* includes a comparing circuit 11 that compares an output voltage Vout of the DC-DC converter with a reference voltage Ref2 and outputs a control value, and a constant current control circuit 12*c* that performs constant current control on the secondary cell B on the basis of the control value. The comparing circuit 11 includes a comparator #D that compares the output voltage of the charger with the reference voltage Ref2, converts the level of the voltage, and outputs the control value.

The constant current control circuit 12*c* includes voltage-dividing resistors R5 and R6. The voltage-dividing resistor R5 has one end connected to a positive output end of the DC-DC converter. The voltage-dividing resistor R6 has one end connected to an output terminal of the comparator #D. Furthermore, a control terminal of a semiconductor switch Q2 is connected to a connection point between the voltage-dividing resistors R5 and R6. The constant current control circuit 12*c* further includes voltage-dividing resistors R7 and R8. The voltage-dividing resistor R7 has one end connected to an output terminal of the semiconductor switch Q2. The voltage-dividing resistor R8 has one end connected to a negative output end of the converter 1.

Furthermore, a control terminal of a second semiconductor switch Q3 is connected to a connection point between the voltage-dividing resistors R7 and R8. The second semiconductor switch Q3*a* is connected to a negative terminal of the secondary cell B. Accordingly, the electric power is supplied to the secondary cell B as a constant current by turning on the semiconductor switch Q2 and the second semiconductor switch Q3*a*, so that the output voltage of the converter 1 is controlled so as to fall to the voltage determined according to the reference voltage Ref2.

In addition, when the output voltage falls, the supply of electric power to the secondary cell B is suppressed by turning off the semiconductor switch Q2 and the second semiconductor switch Q3*a* so that the output voltage of the charger is controlled so as to raise the output voltage of the converter 1 to a voltage determined according to the reference voltage Ref2.

The constant current control circuit 12*c* further includes a semiconductor switch Q10. The semiconductor switch Q10 has input and output terminals that are connected in parallel to the input and output terminals of the semiconductor switch Q2. The constant current control circuit 12*c* further includes voltage-dividing resistors R22 and R23. The voltage-dividing resistor R22 has one end connected to a positive output end of the converter 1. The voltage-dividing resistor R23 has one end connected to an AC input terminal. A control terminal of the semiconductor switch Q10 is connected to a connection point the voltage-dividing resistors R22 and R23. Therefore, when a signal is input from an AC adaptor, a low-level AC is input to the AC input terminal from the outside, and at the same time a stop signal is sent to the converter. Furthermore, when the semiconductor switch Q10 is turned on to start charging with a current from the AC adaptor, the second semiconductor switch Q3*a* is turned on, and the secondary cell B is charged with a constant current. The charging current decreases as the charging voltage of the secondary cell B rises.

Figure 5:
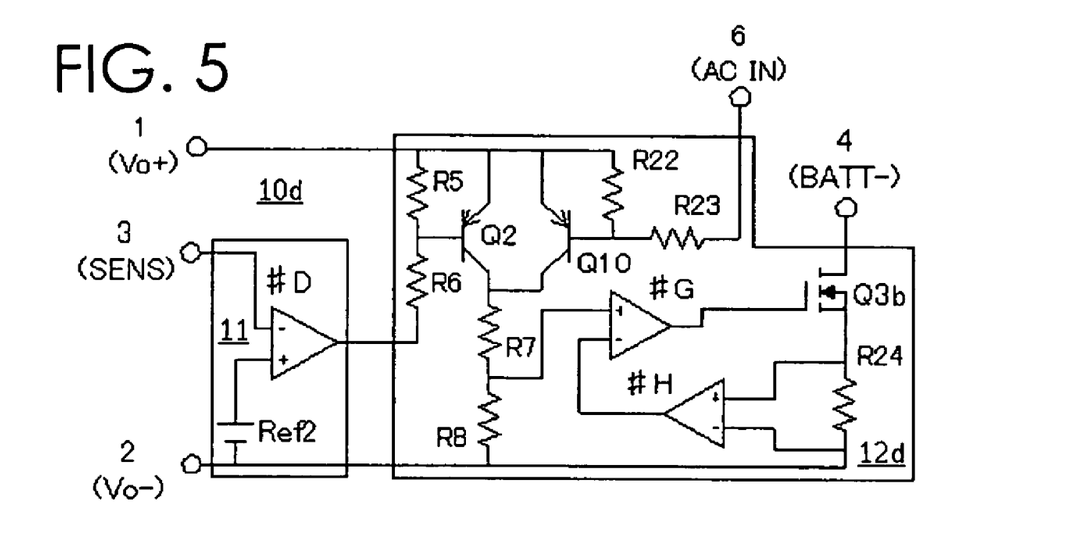
FIG. 5 is a circuit diagram illustrating still another example different from those shown in FIGS. 2 to 4.

FIG. 5 shows a detailed example of yet another current control circuit 10*d*. The current control circuit 10*d* includes a comparing circuit 11 that compares the output voltage of the charger according to the present embodiment with a reference voltage Ref2, and outputs a control value, and a constant current control circuit 12*d* that performs constant current control on a secondary cell B on the basis of the control value. The comparing circuit 11 includes a comparator #D. The comparator #D compares the output voltage of the charger with the reference voltage Ref2, converts the level of the voltage, and outputs the control value.

The constant current control circuit 12*d* includes voltage-dividing resistors R5 and R6. The voltage-dividing resistor R5 has one end connected to a positive output end of the converter 1. The voltage-dividing resistor R6 has one end connected to an output terminal of the comparator #D. Furthermore, a control terminal of a semiconductor switch Q2 is connected to a connection point between the voltage-dividing resistors R5 and R6. The constant current control circuit 12*d* further includes voltage-dividing resistors R7 and R8. The voltage-dividing resistor R7 has one end connected to an output terminal of the semiconductor switch Q2. The voltage-dividing resistor R8 has one end connected to a negative output end of the converter 1.

Furthermore, a detection terminal of a comparator #G is connected to a connection point between the voltage-dividing resistors R7 and R8. The comparator #G has an output terminal connected to a gate terminal of a second semiconductor switch Q3*b* which is, for example, an FET. The second semiconductor switch Q3*b* is connected to a negative terminal of the secondary cell B. Furthermore, the second semiconductor switch Q3*b* has a source terminal connected to one end of a current detection resistor R24. The current detection resistor R24 has both ends connected to two input terminals of a comparator #H. An output terminal of the comparator #H is connected to a reference terminal of the comparator #G, so as to carry out feedback. Accordingly, when an output voltage rises, the electric power is supplied to the secondary cell B as a constant current by turning on the semiconductor switch Q2 and the second semiconductor switch Q3b, so that output voltage of the charger is controlled so as to fall to a voltage determined according to the reference voltage Ref2. At this time, since the highest value of the constant current can be limited by the voltage-dividing resistors R7 and R8, the charging current of the secondary cell B can be arbitrarily set, so that it possible to realize a stable system.

On the other hand, when the output voltage falls, the supply of the electric power to the secondary cell B is suppressed by turning off the semiconductor switch Q2 and the second semiconductor switch Q3b, so that output voltage of the charger is controlled so as to rise to a voltage determined according to the reference voltage Ref2.

The constant current control circuit 12c further includes a semiconductor switch Q10. Input and output terminals of the semiconductor switch Q10 are connected in parallel to input and output terminals of the semiconductor switch Q2. The constant current control circuit 12c further includes voltage-dividing resistors R22 and R23. The voltage-dividing resistor R22 has one end connected to a positive output end of the DC-DC converter. The voltage-dividing resistor R23 has one end connected to an AC input terminal. Furthermore, a control terminal of the semiconductor switch Q10 is connected to a connection point between the voltage-dividing resistors R22 and R 23. Therefore, when a signal is input from an AC adaptor, a low-level AC is input to the AC input terminal from the outside, and at the same time a stop signal is sent to the converter. Further, when the semiconductor switch Q10 is turned on and charging begins with the current from the AC adaptor, the semiconductor switch Q3b is turned on and the secondary cell B is charged with a constant current. In this case, the charging current decreases as the charging voltage of the secondary cell B rises.

The charger having the above-mentioned structure is operated as set forth below: FIGS. 6(a) to 6(e) show time charts of an input voltage Vfc, an input current Ifc, the output voltage Vout, a cell voltage Vbatt, and a charging current Ich, respectively. If charging is started, the input voltage Vfc is lowered, as shown in FIG. 6(a). However, the output voltage Vout rises, as shown in FIG. 6(c). If the output voltage Vout exceeds the reference voltage Ref2, the comparator #D provided in the current control circuit 10 outputs a negative control value. The control value is output to the control terminal of the semiconductor switch Q2 through the voltage-dividing resistors R5 and R6 to cause the semiconductor switch Q2 to be turned on. Furthermore, the control value is also output to the control terminal of the second semiconductor switch Q3 through the voltage-dividing resistors R7 and R8 to cause the second semiconductor switch Q3 to be turned on. Then, the charging current Ich flowing through the secondary cell B increases and the cell voltage Vbatt also rises. When output supply power Pout becomes constant, constant electric power charging begins.

When the constant electric power charging begins, the input voltage Vfc becomes constant due to the constant electric power, as shown in FIG. 6(a). Meanwhile, the output voltage Vout becomes constant by a dropping voltage of the current control circuit 10, as shown in FIG. 6(c). Furthermore, when a current is supplied from the output terminal of the converter 1 to the secondary cell B to charge the secondary cell batt, the cell voltage Vbatt gradually rises, as shown in FIG. 6(d). In addition, the charging current Ich undergoes constant current control by the current control circuit 10 so that the constant current is maintained, as shown in FIG. 6(e).

For a predetermined period of time after charging begins, the constant electric power state continues. However, if the charging reaches the end thereof, the cell voltage Vbatt reaches a value close to the output voltage Vout, whereby the constant current state is therefore not maintained. Accordingly, the charging current Ich decreases, as shown in FIG. 6(e), and the output voltage Vout rises, as shown in FIG. 6(c), so that the constant control is carried out by the constant voltage control value of the converter 1, which is set in the comparator #C. In this case, as the constant electric power state collapses, the input voltage Vfc begins rising, as shown in FIG. 6(a). Furthermore, since when the output voltage Vout rises, a small amount of the charging current Ich flows, the cell voltage Vbatt gradually rises, as shown in FIG. 6(d).

Figure 6:
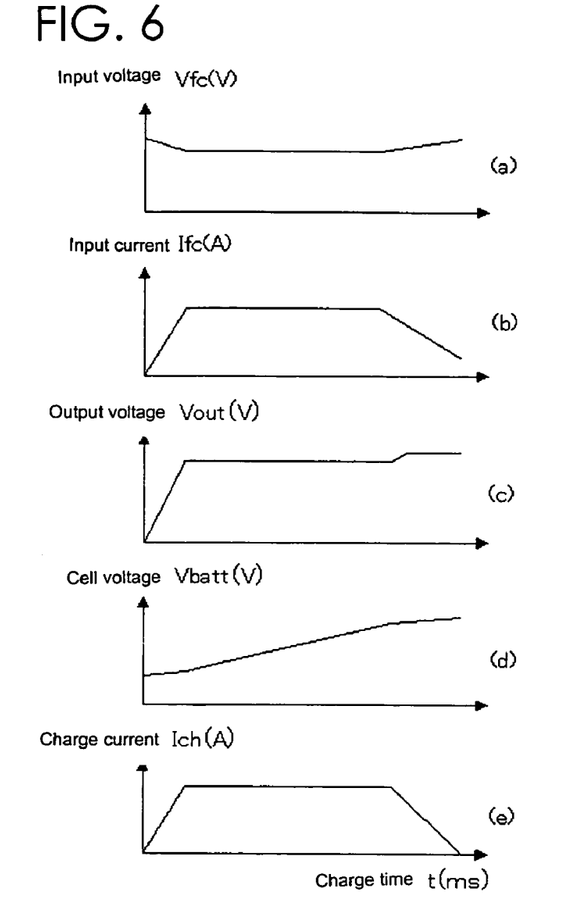
FIG. 6 shows time charts of the charger according to the present invention.

Further, when the operational state detecting circuit 2 detects that the input voltage Vfc begins rising, the control switch Q1 provided in the converter 1 is turned off to stop the charging whereby the charger is available.

EXAMPLE 1

Figure 7:
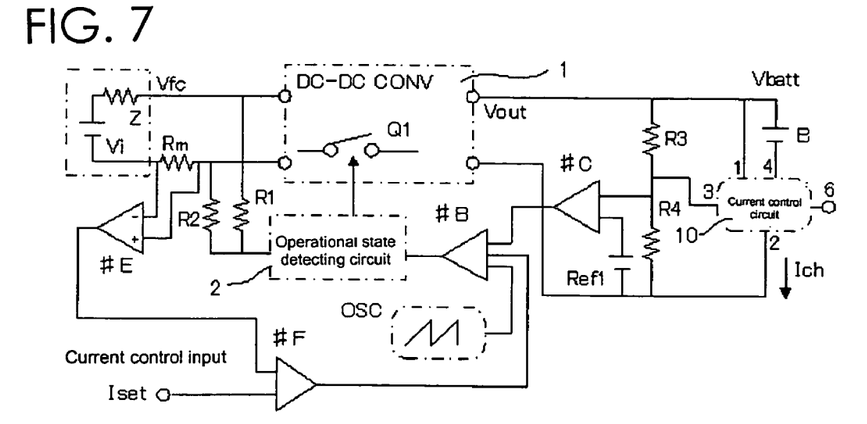
FIG. 7 is a circuit diagram illustrating another charger different from that shown in FIG. 1.

Next, a modified example of the charger according to the present invention is shown in FIG. 7. The charger shown in FIG. 7 receives a current control input Iset of an arbitrary value, for controlling a current input from the outside to a charger, and an output current of the input source Vfc, that is, an input current Ifc of the charger, and outputs a control signal for controlling the input current Ifc to have the same value as that of the current control input Iset. In the present embodiment, a current detection resistor Rm is provided at an output end of the input source Vfc to detect a voltage between input and output ends thereof. The input and output ends of the current detection resistor Rm are connected to input terminals of an amplifier #E, respectively. The amplifier #E amplifies the voltage to a current compensation voltage. Furthermore, as shown in FIGS. 6(a) and 6(b), when the input current Ifc rises, the input voltage Vfc falls in proportion to the rise in the input current Ifc. For this reason, the input end of the current detection resistor Rm is connected to a negative input terminal of the amplifier #E, and the output end of the current detection resistor Rm is connected to a positive input terminal of the amplifier #E.

The charger according to the present embodiment includes a differential amplifier #F, that receives the current control input Iset having an arbitrary value, for controlling a current input to the charger from the outside, and the output current of the input source Vfc, that is, the input current Ifc of the charger, and outputs a control signal to a comparator #B. The other structures are substantially the same as those of the charger shown in FIG. 1, so that a description thereof will be omitted for simplicity.

The charger according to the present embodiment is different from the charger shown in FIG. 1 in that it receives the current control input Iset having an arbitrary value, for controlling a current input from the outside to the charger, and the output current of the input source Vfc, that is, the input current Ifc of the charger and outputs the control signal. However, in this embodiment, when the input current Ifc increases, the input voltage Vfc falls in proportion to the increase in the input current Ifc. Therefore, the operation of the charger of the present embodiment is substantially the same as that of the charger shown in FIG. 1.

EXAMPLE 2

Figure 8:
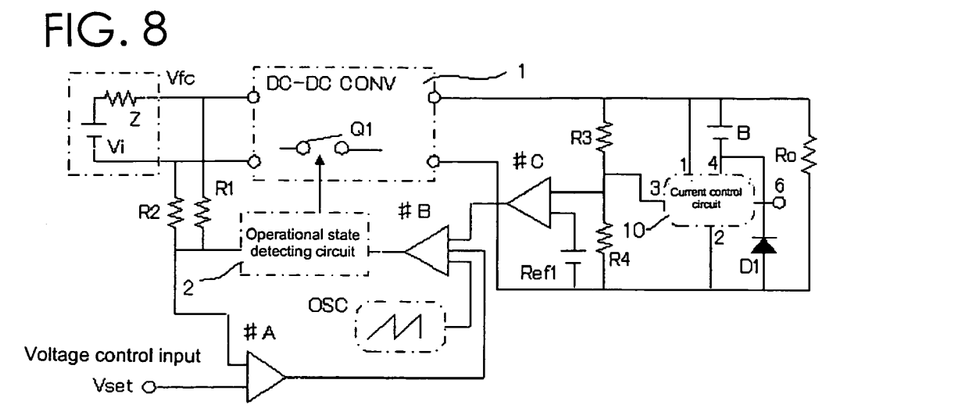
FIG. 8 is a circuit diagram illustrating a DC-DC converter according to another preferred embodiment of the present invention.

Next, a circuit diagram of a DC-DC converter having a charging function according to an embodiment of the present invention is shown in FIG. 8. The DC-DC converter shown in FIG. 8 uses, as an input source Vfc, a fuel cell having relatively large output impedance Z when electric power is supplied. Although in the present embodiment, the fuel cell is used as the input source Vfc, any cell having relatively large output impedance, such as a solar cell, can be used as the input source Vfc. An output end of a DC-DC converter 1 is connected in parallel a load Ro and a secondary cell B.

Voltage-dividing resistors R3 and R4 are also connected to the output end of the DC-DC converter 1. A current control circuit 10 is connected to a connection point between the voltage-dividing resistors R3 and R4. The current control circuit 10 is connected to a negative terminal of the secondary cell B. When a current passing through the load Ro decreases, the current control circuit 10 increases a charging current passing through the secondary cell B. In addition, when the current passing through the load Ro increases, the current control circuit 10 decreases the charging current passing through the secondary cell B. In this way, the current control circuit 10 controls an output voltage to be maintained at a predetermined dropping voltage. Furthermore, in this embodiment, the detailed structure of the current control circuit 10 is the same as that of the above-mentioned charger. Therefore, a description thereof will be omitted for simplicity.

The DC-DC converter according to the present invention further includes a voltage comparator #C. The voltage comparator #C compares an output voltage signal detected by the voltage-dividing resistors R3 and R4 with a reference voltage Ref1, converts the levels of the voltage signals, and outputs the voltage signal to a comparator #B connected to an output terminal thereof.

The DC-DC converter according to the present invention further includes a differential amplifier #A. The differential amplifier #A receives a voltage control input Vset having an arbitrary value, for controlling the input voltage of the DC-DC converter, and an output voltage Vfc of the fuel cell, and outputs a control signal for controlling the input voltage Vfc to have the same value as that of the voltage control input Vset.

Furthermore, the voltage control input Vset can be represented by the following expression:

$$Vset = Vfc * R2/(R1+R2).$$

For example, if R1=R2=1 kΩ and a cell output needs to be 5V, Vset=5V*1 k/(1 k+1 k)=2.5 V. Therefore, 2.5V may be input from the outside.

The comparator #B compares a voltage signal, which is obtained by converting the level of the output voltage of the load R through the voltage detector #C, with a control signal for stable control, which is output from a triangular wave oscillator (OSC), and outputs a driving signal to a control switch Q1 of the DC-DC converter 1.

Figure 9:
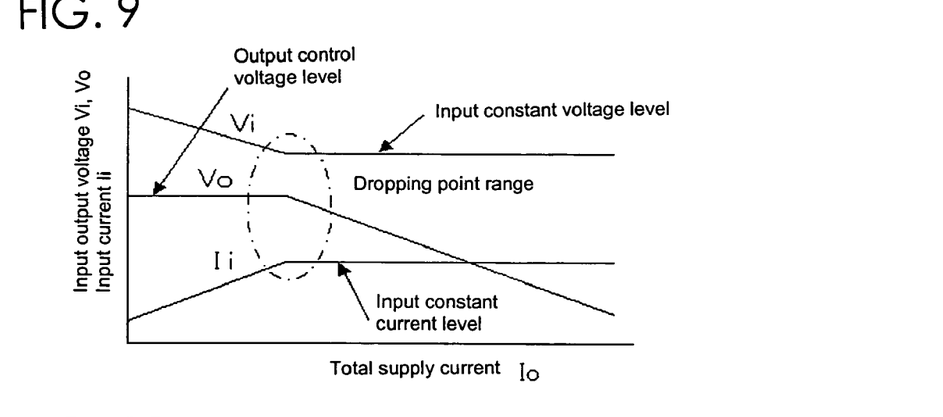
FIG. 9 is a graph of an operational waveform, showing an electric power characteristic when a current control circuit is not operated.
Figure 10:
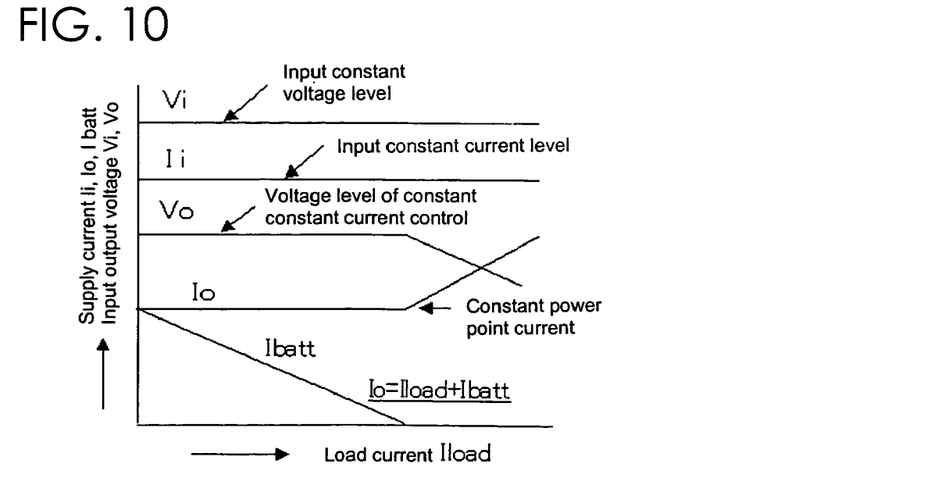
FIG. 10 is a graph of an operational waveform, showing an electric power characteristic when the current control circuit is operated.

The DC-DC converter having the above-mentioned structure can be operated as set forth below. Furthermore, FIG. 9 shows an electric power characteristic when the current control circuit is not operated, and FIG. 10 shows an electric power characteristic when the current control circuit is operated. In the DC-DC converter according to the present invention, when a current flowing through the load Ro is higher than a rating (i.e., a dropping state), the current control circuit 10 is not operated, and a current is supplied from the output of the DC-DC converter and the secondary cell B, as shown in FIG. 9. The secondary cell B supplies a power through a diode D1.

Next, a case in which a load current Iload decreases will be described below. If the load current Iload decreases, as shown in FIG. 10, an output voltage Vo rises. If the output voltage Vo rises to exceed the reference voltage Ref2, a negative control value is output from the comparator #D provided in the current control circuit 10. The control value is output to the control terminal of the semiconductor switch Q2 via the voltage-dividing resistors R5 and R6, so that the semiconductor switch Q2 is turned on. Furthermore, if the control value is output to the control terminal of the second semiconductor switch Q3 via the voltage-dividing resistors R7 and R8 so that the second semiconductor switch Q3 is turned on, a charging current Ibatt flowing through the secondary cell B increases, and the output supply electric power Pout becomes constant. In this way, an output voltage Vo can be stabilized at a dropping point.

Then, a case in which the load current Iload increases will be described below. If the load current Iload increases, as shown in FIG. 10, the output voltage Vo falls. If the output voltage Vo falls below the reference voltage Ref2, a positive control value is output from the comparator #D provided in the current control circuit 10. The control value is output to the control terminal of the semiconductor switch Q2 via the voltage-dividing resistors R5 and R6, so that the semiconductor switch Q2 is turned off. Furthermore, if the control value is output to the control terminal of the second semiconductor switch Q3 via the voltage-dividing resistors R7 and R8 so that the second semiconductor switch Q3 is turned off, the charging current Ibatt flowing through the secondary cell B decreases, and the output supply power Pout becomes constant. In this way, the output voltage Vo can be stabilized at a dropping point.

EXAMPLE 3

Figure 11:
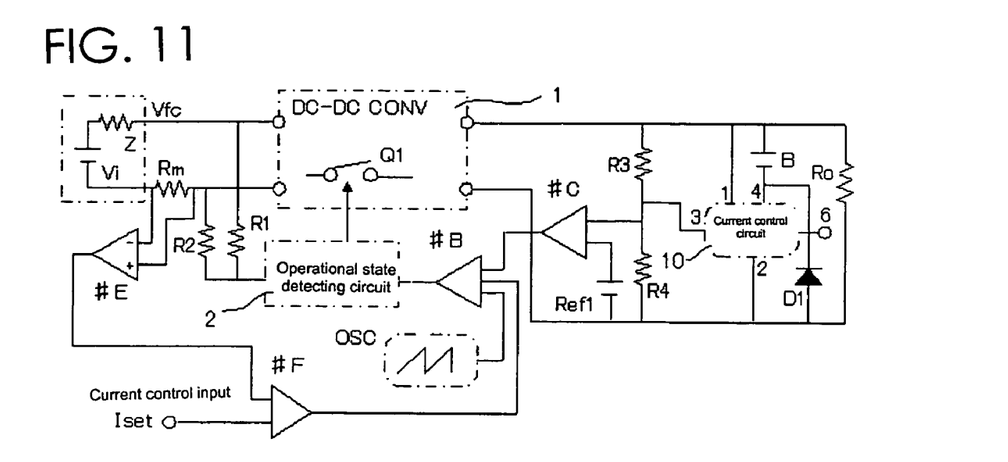
FIG. 11 is a circuit diagram illustrating a DC-DC converter different from that shown in FIG. 8.

Next, a modified example of the DC-DC converter having a charging function according to the present invention is shown in FIG. 11. The DC-DC converter shown in FIG. 11 receives a current control input Iset of an arbitrary value, for controlling a current input from the outside to a charger, and an output current of the input source Vfc, that is, the input current Ifc of the charger, and outputs a control signal, in the same manner as the charger shown in FIG. 7. The detailed structure of the DC-DC converter is substantially the same as that of the charger shown in FIG. 7 so that a description thereof will be omitted for simplicity. Furthermore, a fuel cell has a property in which, when the input current increases, the input voltage falls in proportion to the increases in the input current, as shown in FIG. 9. Therefore, the operation of the DC-DC converter according to this embodiment is substantially the same as that the DC-DC converter shown in FIG. 8.

INDUSTRIAL APPLICABILITY

According to the charger in accordance with the present invention, charging to the secondary cell begins with the current control circuit to which is the secondary cell is connected, in that if a charging current passing through the secondary cell increases and the voltage of the secondary cell approaches to an output voltage, the charger is constructed to decrease the charging current passing into the secondary cell. Therefore, the present invention is advantageous in that an input voltage (for example, the output of a fuel cell) can be constantly controlled since the whole output supply power can become constant. Furthermore, the DC-DC converter according to the present invention can have the same advantages as those of the charger. Furthermore, since the output voltage can be stabilized at a predetermined dropping point. Therefore, the present invention is advantageous, since stable electric power can be supplied to a load.

The invention claimed is:

1. A charger that charges a secondary cell through a converter for constantly controlling input electric power from a cell having relatively large output impedance when electric power is supplied, such as a fuel cell or a solar cell as an input source, comprising:

a current control circuit having the secondary cell provided at an output thereof, that is connected to the secondary cell, and supplies a charging current flowing into the secondary cell as a current value which is obtained from a control amount necessary for keeping an output voltage of the converter at a dropping voltage to be set, wherein, when charging to the secondary cell is started, the current control circuit performs constant current charging in which the charging current flowing into the secondary cell is used as a current value determined according to an input electric power value, and at an end period of the charging when the voltage of the secondary cell reaches approximately an output voltage, the current control circuit stops performing constant control of the input electric power and detects a rise in an input voltage, thereby stopping the charging.

2. A charger that charges a secondary cell through a converter for constantly controlling input electric power from a cell having relatively large output impedance when electric power is supplied, such as a fuel cell or a solar cell as an input source, wherein, when charging to the secondary cell is started, the current control circuit performs constant current charging in which the charging current flowing into the secondary cell is used as a current value determined according to output voltage, and at an end period of the charging when the voltage of the secondary cell reaches approximately an output voltage, the current control circuit stops performing constant control of the input electric power, thereby stopping the charging.

3. The charger according to claim 1, wherein the current control circuit includes a comparing unit which compares the output voltage of the converter with a reference voltage and outputs a control amount, and a constant current control unit that performs constant current control on the secondary cell, on the basis of the control value.

4. The charger according to claim 2, wherein the current control circuit includes a comparing unit which compares the output voltage of the converter with a reference voltage and outputs a control amount, a semiconductor switch which is turned on and off based on the control value, and a constant current control unit that performs constant current control on the secondary cell based on the turning on and off.

5. The charger according to claim 4, wherein the constant current control unit includes a first level conversion unit which is connected to an output end of the comparing unit, the first level conversion unit being connected to a positive output end of the converter and a control terminal of the semiconductor switch, and a second level conversion unit which is connected to an output terminal of the semiconductor switch, the second level conversion unit being connected to a negative output end of the converter and a control terminal of a second semiconductor switch, wherein an output terminal of the second semiconductor switch is connected to a negative terminal of the secondary cell, and when charging to the secondary cell is started, the current control circuit performs the constant current charging in which the charging current flowing into the secondary cell is used as a current value which is determined according to output voltage, and at an end period of charging when the voltage of the secondary cell reaches approximately an output voltage, the current control circuit stops performing the constant control of the input electrical power and detects a rise in the input voltage, thereby stopping the charging.

6. The charger according to claim 2, wherein the charger has functions of detecting a voltage of the input source, of comparing the input voltage with a voltage control input that is arbitrarily set, and of controlling the input voltage to be constant on the basis of the control value.

7. The charger according to claim 3, wherein the charger has functions of detecting a voltage of the input source, of comparing the input voltage with a voltage control input that is arbitrarily set, and of controlling the input voltage to be constant on the basis of the control value.

8. The charger according to claim 4, wherein the charger has functions of detecting a voltage of the input source, of comparing the input voltage with a voltage control input that is arbitrarily set, and of controlling the input voltage to be constant on the basis of the control value.

9. The charger according to claim 5, wherein the charger has functions of detecting a voltage of the input source, of comparing the input voltage with a voltage control input that is arbitrarily set, and of controlling the input voltage to be constant on the basis of the control value.

10. A DC-DC converter that uses, as an input source, a cell such as a fuel cell or a solar cell, having relatively large output impedance when electric power is supplied, comprising:

a secondary cell which is charged through a converter which performs constant input electric power control, wherein a current control circuit is connected to the secondary cell, in which the secondary cell and a load are connected in parallel to an output end of the a current control circuit, and when a current flowing through the load decreases, the current control circuit increases a charging current flowing into the secondary cell, and when the current flowing through the load increases, the current control circuit decreases the charging current flowing into the secondary cell, thereby keeping an output voltage at a dropping voltage to be set.

11. The DC-DC converter according to claim 10, the current control circuit includes a comparing unit which compares the output voltage of the DC-DC converter with a reference voltage and outputs the control amount, a semiconductor switch which is turned on and off based on the control amount, and a constant current control unit that performs constant current control on the secondary cell based on the turning on and off.

12. The DC-DC converter according to claim 11, wherein the constant current control unit includes a first level conversion unit which is connected to an output end of the comparing unit, the first level conversion unit being connected to a positive output end of the DC-DC converter and a control terminal of the semiconductor switch, and a second level conversion unit which is connected to an output terminal of the semiconductor switch, the second level conversion unit being connected to a negative output end of the DC-DC converter and a control terminal of a second semiconductor switch, the second semiconductor switch is connected to a negative terminal of the secondary cell, when a current flowing through the load decreases, the current control circuit increases a charging current flowing into the secondary cell, and when the current flowing through the load increases, the current control circuit decreases the charging current flowing into the secondary cell, thereby keeping the output voltage at a dropping voltage to be set.

13. The DC-DC converter according to claim 11, wherein the DC-DC converter has functions of detecting a voltage of the input source, of comparing the input voltage with a voltage control input that is arbitrarily set, and of controlling the input voltage to be constant on the basis of the control value.

14. The DC-DC converter according to claim 11, wherein the DC-DC converter has functions of detecting a voltage of the input source, of comparing the input voltage with a voltage control input that is arbitrarily set, and of controlling the input voltage to be constant on the basis of the control value.

15. The DC-DC converter according to claim 12, wherein the DC-DC converter has functions of detecting a voltage of the input source, of comparing the input voltage with a voltage control input that is arbitrarily set, and of controlling the input voltage to be constant on the basis of the control value.

* * * * *